(12) United States Patent
Oort

(10) Patent No.: US 6,494,163 B1
(45) Date of Patent: Dec. 17, 2002

(54) VACUUM CONTROL SYSTEM

(75) Inventor: Dick Marius Oort, Amersfoort (NL)

(73) Assignee: Lely Research Holdings AG, Zug (CH)

(*) Notice: Subject to any disclaimer, the term of this patent is extended or adjusted under 35 U.S.C. 154(b) by 0 days.

(21) Appl. No.: 09/623,409

(22) PCT Filed: Jan. 5, 2000

(86) PCT No.: PCT/NL00/00007

§ 371 (c)(1),
(2), (4) Date: Sep. 5, 2000

(87) PCT Pub. No.: WO00/40076

PCT Pub. Date: Jul. 13, 2000

(30) Foreign Application Priority Data

Jan. 6, 1999 (NL) .............................. 1010963

(51) Int. Cl.$^7$ ................................. A01J 5/007
(52) U.S. Cl. ............ 119/14.1; 119/14.43; 119/14.44
(58) Field of Search .................. 119/14.1, 14.08, 119/14.43, 14.44

(56) References Cited

U.S. PATENT DOCUMENTS 6,164,242 A * 12/2000 Olofsson ................. 119/14.02

FOREIGN PATENT DOCUMENTS

| EP | 0 576086 A2 | 12/1993 |
| EP | 0 584890 A3 | 3/1994 |
| WO | WO 96/25036 | 8/1996 |
| WO | WO 97/01270 | 1/1997 |
| WO | WO 98/34472 | 8/1998 |
| WO | WO98/46068 | 10/1998 |

* cited by examiner

Primary Examiner—Robert P. Swiatek
(74) Attorney, Agent, or Firm—Penrose Lucas Albright

(57) ABSTRACT

A vacuum control system for controlling vacuum while an animal is being milked. The vacuum control system comprises a vacuum pump which is interconnected to a buffer vessel via a vacuum line. Each teat cup of the milking apparatus has a milk line which interconnects the teat cup to the buffer vessel. The teat cup is also interconnected to the vacuum pump via a pulse line which contains a pulsator. A regulator which includes an rpm governor and an electronic filter unit is connected to the vacuum pump and also by the filter unit to a vacuum sensor which, in turn is connected to the vacuum line. The filter unit is connected both to the rpm governor and to an electronic fast-acting control valve which is activated by the regulator on the basis of signals which it receives from the vacuum sensor. If the vacuum decreases in the vacuum line (and thus the buffer vessel) as result of, for example, a teat cup being disconnected from the teat of an animal being milked, the rpm governor causes the vacuum pump to increase its rpm and therefore capacity whereby the vacuum and vacuum line is maintained in a constant value. On the other hand, if the vacuum and vacuum line increases over its desired level, the electronic fast-acting valve is actuated to admit air to the vacuum line and thereby maintain the vacuum therein at a constant desired level.

10 Claims, 1 Drawing Sheet

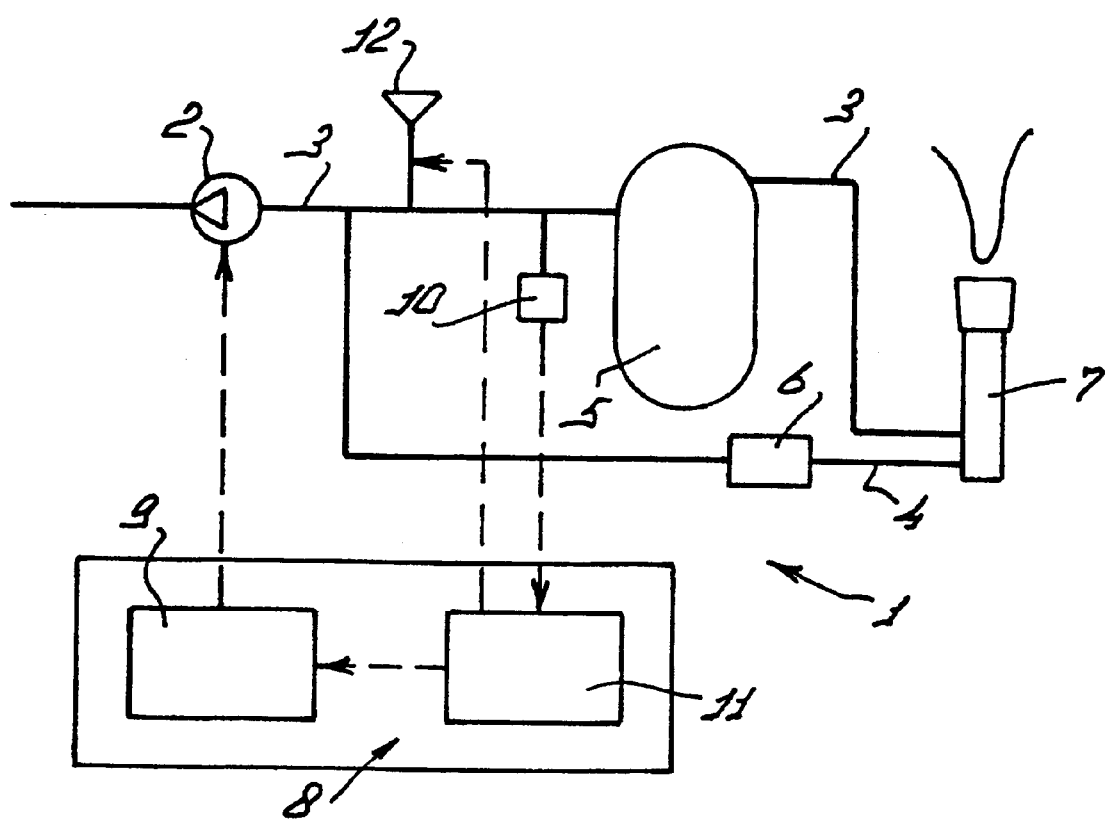

VACUUM CONTROL SYSTEM

RELATED APPLICATION

This Application is a 371 of International Application No. PCT/NL00/00007, filed Jan. 5, 2000.

1. Field of Invention

The invention relates to a vacuum control system for controlling vacuum while milking an animal.

2. Background of the Invention

In known vacuum control systems the vacuum pump runs at a constant rotational speed of approximately 1,500 revolutions per minute and the regulator comprises a mechanical valve with the aid of which air is admitted to the vacuum control system, so that a desired vacuum level is maintained in the system. If the regulator operates properly, the vacuum level is independent of the air consumption of the teat cup or a pulsator, if any. In that case the vacuum pump displaces a quantity of air of approximately 400 liters per minute. As a result, the vacuum is maintained within the maximally allowed deviation from the desired value, even in the situation of an open teat cup. If all the teat cups are connected to the teats of an animal to be milked, this means that the greater part of the 400 liters of air per minute flows through the mechanical valve of the regulator. This has the disadvantage that the energy consumption of the vacuum pump is high, because the pump is always displacing the maximum quantity of air. The vacuum level further depends on the pump capacity. Another disadvantage is that, if it is desired to guarantee the stability of the vacuum, level in the long term, it is necessary to check the mechanical valve regularly, such valve not having a calibration point.

An object of the invention is to obviate the above-mentioned drawbacks or at least to minimize them.

SUMMARY OF THE INVENTION

In accordance with the invention, the above object of the invention is to achieved by means of using a speed regulator, preferably a frequency regulator to control vacuum pump rpm or using an electronic valve to control the amount of air admitted to the system or by using both controls. In this manner it is possible to reduce the number of revolutions of the vacuum pump during milking when the air consumption is very low, as a result of which much energy is saved relative to known systems. Because of the fact that it is possible to select a higher rotational speed of the pump than the situation of the existing pump, that is, for example, 3,600 revolutions per minute, it is further possible to displace the same quantity of air of 400 liters per minute with a smaller pump. A further advantage of the frequency regulator is that the stability of the vacuum level can be guaranteed in the long term. The frequency regulator also offers the possibility of controlling the vacuum level per animal or per teat.

A further advantage is that by means of the electronic valve, which is known per se from automotive engineering, it is possible to anticipate vacuum fluctuation because of the fact that the valve comprises a very fast-acting control valve. In this manner a very stable vacuum level can be guaranteed in the situation of suddenly occurring alterations in the system, such as, for example, may occur when a teat cup is disconnected from a teat.

According to an inventive feature, a vacuum sensor is connected to the regulator. By means of the vacuum sensor, it is possible to activate the frequency regulator on the basis of the measured vacuum.

BRIEF DESCRIPTION OF THE DRAWING

The invention will now be explained in further detail with reference to the accompanying drawing.

FIG. 1 is a schematic vacuum control system according to the invention.

DETAILED DESCRIPTION OF THE PREFERRED EMBODIMENTS

FIG. 1 shows a vacuum control system 1 for controlling the vacuum when milking an animal. Vacuum control system 1 may constitute part of a conventional milking machine or a milking robot of a fully automated milking system. It comprises a vacuum pump 2 connected to a vacuum line 3 and a pulse line 4 is also connected thereto. In vacuum line 3 is included a buffer vessel 5 which, in the present embodiment, is designed as a milk glass. As is well known in the art, buffer vessel 5 is further connected to a milk line that leads to a milk tank. Buffer vessel 5 may also be termed in the art as a glass, a receptacle, or a claw. In pulse line 4 is a pulsator 6 by means of which an alternating vacuum is applied in a pulsation space of a teat cup 7.

Vacuum control system 1 further comprises a regulator 8 by means of which the vacuum level in the system can be controlled at a desired vacuum level. Regulator 8 comprises a frequency regulator or governor 9 by means of which the rpm of vacuum pump 2 can be controlled. In vacuum control system 1 there is a vacuum sensor 10 which signals the level of vacuum to regulator 8. Regulator 8 includes a filter unit 11 for filtering the signal emanating from vacuum sensor member 10. Further in vacuum control system 1 is an electronic valve 12 by means of which air can be admitted to the vacuum control system. Electronic valve 12 comprises a fast-acting control valve, which is known per se from the automotive engineering. Electronic valve 12 is activated by regulator 8, on the basis of signals which it receives from vacuum sensor 10. Vacuum sensor 10 and electronic valve 12 are in that part of the vacuum line system which is located between buffer vessel 5 and vacuum pump 2.

In accordance with the invention, electronic valve 12 in the described embodiment may, if desired, be omitted. It is also possible to make use only of electronic valve 12 and consequently to omit frequency governor 9.

Although I have disclosed the preferred embodiments of my invention, it is to be understood that it is capable of other adaptations and modifications within the scope of the following claims.

Having disclosed my invention, what I claim as new and to be secured by Letters Patent of the United States of America is:

1. A fully automated milking apparatus which comprises a plurality of teat cups to be received by an animal being milked by the apparatus, a milking robot for automatically connecting said plurality of teat cups to an animal to be milked and disconnecting them at the completion of the milking each of said teat cups having a milking line leading therefrom to a receptacle and also a pulse line leading therefrom, a vacuum pump, said vacuum pump being operatively interconnected to said milk lines via said receptacle and further being interconnected with said pulse lines via pulsation means, a vacuum regulator for said vacuum pump for retaining a constant vacuum in said receptacle, said vacuum regulator comprising an electronic fast-acting valve interconnected to said receptacle which is activated by and connected to a regulator on the basis of signals which said regulator receives from a vacuum sensor which is operatively interconnected to said vacuum pump and to said receptacle.

2. A vacuum control system for controlling the vacuum during milking an animal, which comprises a vacuum pump, a vacuum line interconnected therewith, a pulse line, at least one teat cup connected to said pulse line, a regulator by means of which the vacuum in the system is controlled at a desired vacuum level, said regulator comprising a revolution per minute governor that controls the vacuum pump's revolutions per minute, and an electronic valve that admits air into the system.

3. A vacuum control system in accordance with claim 2, comprising a vacuum sensor which is connected to said regulator.

4. A vacuum control system in accordance with claim 3, wherein said regulator comprises a filter unit that filters the signal emanating from said vacuum sensor.

5. A vacuum control system in accordance with claim 2, wherein said electronic valve, is connected to said regulator.

6. A vacuum control system in accordance with claim 2, wherein said electronic valve connects to said vacuum line which is connected to said vacuum pump.

7. A vacuum control system in accordance with claim 2, which comprises at least one further teat cup and at least one further electronic valve, each said electronic valve being connected to a corresponding said teat cup.

8. A vacuum control system in accordance with claim 2, which further comprises a vacuum buffer vessel which interconnects said teat cup with said vacuum pump.

9. A vacuum control system in accordance with claim 2, which comprises a pulsator for pulsating vacuum in said teat cup, said pulsator interconnecting said pulse line and said vacuum pump.

10. A fully automated milking apparatus which comprises a plurality of teat cups to be received by an animal being milked by the apparatus, a milking robot for automatically connecting said teat cups to an animal to be milked and disconnecting said teat cups when the milking is completed, a milk line leading from each of said teat cups, a plurality of pulse lines each connected to a respective one of said teat cups, a vacuum pump which is directly connected to a receptacle that receives said milk lines, said vacuum pump interconnected to each of said pulse lines via a pulsator means, said vacuum pump having a revolutions per minute governor, a vacuum sensor interconnected to each said milk line by being directly connected to a location between said vacuum pump and said receptacle, whereupon said revolutions per minute governor controls the vacuum in said receptacle at a substantially constant uniform value irrespective of whether or not one or more of said teat cups are received by the animal's teat at the time.

* * * * *